(12) United States Patent
Schnaedelbach et al.

(10) Patent No.: US 9,709,126 B2
(45) Date of Patent: Jul. 18, 2017

(54) TORSIONAL VIBRATION DAMPER

(71) Applicant: Schaeffler Technologies GmbH & Co. KG, Herzogenaurach (DE)

(72) Inventors: David Schnaedelbach, Baden-Baden-Neuweier (DE); Christian Huegel, Rheinau (DE); Michael Rieber, Willstaett (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/410,953

(22) PCT Filed: Jul. 3, 2013

(86) PCT No.: PCT/EP2013/064049
§ 371 (c)(1),
(2) Date: Dec. 23, 2014

(87) PCT Pub. No.: WO2014/006098
PCT Pub. Date: Jan. 9, 2014

(65) Prior Publication Data
US 2015/0204416 A1    Jul. 23, 2015

(30) Foreign Application Priority Data
Jul. 6, 2012  (DE) .................. 10 2012 211 820

(51) Int. Cl.
*F16F 15/14*    (2006.01)

(52) U.S. Cl.
CPC ............ *F16F 15/14* (2013.01); *F16F 15/145* (2013.01); *Y10T 74/2128* (2015.01)

(58) Field of Classification Search
CPC .................. F16F 15/14; F16F 15/145
USPC ............................................ 74/574.2
See application file for complete search history.

(56) References Cited

U.S. PATENT DOCUMENTS

2012/0055281 A1\*  3/2012  Huegel ................. F16F 15/145
                                                               74/574.2

FOREIGN PATENT DOCUMENTS

| DE | 102007029609 | | 1/2009 | |
|---|---|---|---|---|
| DE | 102007029609 | A1 \* | 1/2009 | ............ F16F 15/145 |
| DE | 102011103471 | | 12/2011 | |
| WO | WO 2011120485 | A1 \* | 10/2011 | ............ F16F 15/123 |

(Continued)

OTHER PUBLICATIONS

DE 102007029609 Translation.\*

*Primary Examiner* — Vicky Johnson
(74) *Attorney, Agent, or Firm* — Simpson & Simpson, PLLC

(57) ABSTRACT

A torsional vibration damper includes a pendulum flange which is rotatable around an axis of rotation, having a cutout, as well as two pendulum mass pairs which are movably attached to the pendulum flange, adjacent to each other in the circumferential direction, and an elastic element to damp mutual colliding of adjacent pendulum mass pairs. The pendulum mass pairs each comprise two pendulum masses which are positioned opposite each other relative to the pendulum flange, and a bolt which runs through the cutout and connects the pendulum masses to each other axially. In the area of the cutout an elastic element is attached to each of the two bolts, which is set up to collide with the other elastic element in the circumferential direction.

9 Claims, 4 Drawing Sheets

(56) References Cited

FOREIGN PATENT DOCUMENTS

WO 2012083920 6/2012

* cited by examiner

TORSIONAL VIBRATION DAMPER

CROSS-REFERENCE TO RELATED APPLICATIONS

The present application is the U.S. National Stage Application pursuant to 35 U.S.C. §371 of International Application No. PCT/EP2013/064049, filed on Jul. 3, 2013, which application claims priority from German Patent Application No. DE 10 2012 211 820.9, filed on Jul. 6, 2012, which applications are incorporated herein by reference in their entireties.

TECHNICAL FIELD

The present invention relates generally to a torsional vibration damper, and, more specifically, to a torsional vibration damper used in a drivetrain of a motor vehicle.

BACKGROUND

A torsional vibration damper is used in a drivetrain of a motor vehicle to transmit a torque to the transmission from a drive motor. Besides transmitting the torque, the torsional vibration damper has the task of absorbing any torsional vibrations which may be superimposed on the torque.

Vibrations in a drivetrain can be damped using pendulum dampers. These dampers have a plurality of pendulum masses configured along the circumference of a pendulum flange or plate. In order to maximize the amplitude of the oscillatory motion of the pendulum masses, the pendulum masses and their guides are typically chosen in such a way that adjacent pendulum masses may collide with each other. A collision may occur, for example, at a very low speed of rotation or under very severe torque fluctuations. Wear of the pendulum masses can be promoted by the collisions, and disturbing noise can arise.

SUMMARY

According to aspects illustrated herein, there is provided a torsional vibration damper including a pendulum flange having a cutout and configured to rotate around an axis of rotation, a first pendulum mass pair movably attached to the pendulum flange and having a first pendulum mass axially displaced from a second pendulum mass, and a first bolt extending axially through the cutout and fixedly securing the first pendulum mass to the second pendulum mass, a first elastic element attached to the first bolt, a second pendulum mass pair movably attached to the pendulum flange and adjacent to the first pendulum mass pair in a circumferential direction, the second mass pair having a third pendulum mass axially displaced from a fourth pendulum mass, with the third pendulum mass adjacent to the first pendulum mass in the circumferential direction and the fourth pendulum mass adjacent to the second pendulum mass in the circumferential direction, and a second bolt extending axially through the cutout and fixedly securing the third pendulum mass to the fourth pendulum mass, and, a second elastic element attached to the second bolt wherein the first and second elastic elements are operatively arranged to mutually impact each other in the circumferential direction to dampen a collision between the first and second pendulum mass pairs.

A general object of the present invention is to provide a torsional vibration damper with which elastic elements for damping a collision of the pendulum masses against each other can achieve a predetermined service life even under unfavorable conditions.

To this end, the torsional vibration damper generally includes a pendulum flange, on which a pendulum mass is attached such that the pendulum mass can oscillate relative to the pendulum flange. By means of a sliding block guide, the pendulum mass is guided on the pendulum flange in such a way that it moves radially inward when the pendulum flange is accelerated around its axis of rotation, and the rotational moment of the torsional vibration damper is changed. To cushion the collisions, elastic elements are attached to the pendulum masses so that a mutual impact of two pendulum masses can take place with elastic damping.

In an example embodiment, the pendulum mass is a trapezoidal pendulum, which is guided bifilarly on the pendulum flange. This enables the pendulum mass to shift (or oscillate) with respect to the pendulum flange as well as to rotate about an axis of its own in the pendulum flange's plane of rotation, whereby additional energy can be stored. The shifting motion and the rotary motion of the pendulum mass can be coupled with each other by the sliding block guide, either partially or completely.

In order to guarantee a life expectancy of the elastic element, however, it is necessary to limit a maximum compression loading of the elastic element to a predetermined value. To this end, a stop may be used, which restricts the oscillatory motion of the pendulum mass relative to the pendulum flange. In an example embodiment, the pendulum mass is guided on the pendulum flange by means of two sliding block guides, where one of the sliding block guides has a sliding block jacketed with an elastic element. The other sliding block guide is dimensioned so that it limits the movement of the pendulum mass relative to the pendulum flange, thereby limiting the compression of the elastic element on the other sliding block guide to a predetermined extent.

However, under certain operating conditions, the pendulum mass is unable to maintain the intended theoretical path and can move haphazardly within the confines of its guide. During such occasions, the elastic elements may come into contact with one another on the faces of the pendulum masses, which is an undesirable result.

Through the position of the elastic elements on the bolts, the elastic elements can be covered and hence protected in their position on the torsional vibration damper. In the event of an impact of the two pendulum mass pairs against each other, a damping path can occur between the two elastic elements, and can therefore be longer than the damping path that occurs upon impact of one of the pendulum mass pairs in the radial direction. A diminution of energy in the impact can thus occur in an improved way in the direction in which the greatest collision energy is to be expected.

In an example embodiment, the elastic element protrudes in the circumferential direction of the torsional vibration damper by a predetermined amount, e.g., by only a predetermined fraction of its dimensions beyond a boundary of the pendulum mass. This enables a mutual collision of adjacent pendulum masses to limit the compression of the elastic elements.

In this way, the delimitation of the compression path of the elastic elements can be guaranteed, independently of whether the ends of the pendulum mass pairs facing each other are deflected radially on the pendulum flange by different distances. The loading of the elastic elements can thus be reduced to a predetermined measure under all operating conditions of the torsional vibration damper. A life expectancy of the elastic elements can therefore be determined reliably, or can be assured through appropriate dimensioning of the elastic elements.

In an example embodiment, the cutout is dimensioned so that the elastic elements can also impact against radial boundaries of the cutout. Thus a radial motion of each pendulum mass pair relative to the pendulum flange in the area of the end of the motion specified by the cutout can also be damped by the elastic element.

In the example embodiments having a trapezoid pendulum, the pendulum mass pairs may each follow complex paths. While sections of these complex paths may seldom be occupied by the pendulum masses, the sections actually occupied by the pendulum masses better depict a curve. The described protection of the elastic elements against high compression loads can be brought to bear here with particular advantage.

In an example embodiment, the elastic elements are each attached to the bolts assigned to them in a radially symmetrical pattern. This damps an impact of the pendulum mass pair during its motion relative to the pendulum flange in all possible directions of motion.

In an example embodiment, the elastic elements can rotate relative to the pendulum masses. Wear or aging of the elastic element through loading can thus be distributed over the entire circumference of the elastic element. This can lead to an increased loading capacity or an extended life of the elastic element.

In an example embodiment, the surfaces of the pendulum masses in the area proximate the elastic elements may have a contour that follows a contour of the elastic element. Under the condition named above, that the elastic element protrudes beyond the outline of the pendulum mass pair by only a predetermined amount, the pendulum mass pair can have, in its end regions lying in the circumferential direction, a form which simultaneously guarantees the impact of the elastic elements and maximizes the size of the pendulum mass pairs.

In an example embodiment, a torsional vibration damper includes at least three of the pendulum mass pairs, which are attached to the pendulum flange such that they can oscillate relative to the pendulum flange, each pendulum mass pair having, in the area of its two ends lying in the circumferential direction, a bolt with an elastic element attached thereto.

In this way, all ends of the used pendulum mass pairs can be protected from a collision by the corresponding elastic element, while at the same time the elastic elements are protected from an excessively high compression load. Because of the mass ratios on trapezoid pendulums, it has proven to be advantageous to position exactly three pendulum mass pairs on a circumference around the axis of rotation on the pendulum flange. Preferably, the fragment of the elastic elements which protrudes beyond the boundary of the pendulum masses is dimensioned depending on a material, a projected load alteration figure, an expected maximum collision energy or a geometry of the elastic element.

In an example embodiment, the fragment of the elastic element protruding beyond the boundary of the pendulum masses amounts to approximately 40% of its material strength.

With this value it has been possible in experiments to demonstrate a good sustainability of the elastic elements when the torsional vibration damper is operated in the drivetrain of a motor vehicle.

These and other objects, advantages and features of the present invention will be better appreciated by those having ordinary skill in the art in view of the following detailed description of the invention in view of the drawings.

BRIEF DESCRIPTION OF THE DRAWINGS

The invention will now be described in greater detail by reference to the accompanying figures, in which the figures represent the following.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that the invention is not limited to the particular methodology, materials and modifications described in this disclosure and as such may, of course, vary. It is also understood that the terminology used herein is for the purpose of describing particular aspects only, and is not intended to limit the scope of the present invention.

Unless defined otherwise, all technical and scientific terms used herein have the same meaning as commonly understood to one of ordinary skill in the art to which this invention belongs. It should be understood that any methods, devices or materials similar or equivalent to those described herein can be used in the practice or testing of the invention.

By "movably attached" first component to a second component, we mean that the first component is connected to the second component so that it can oscillate with respect to the second component.

Figure 1:
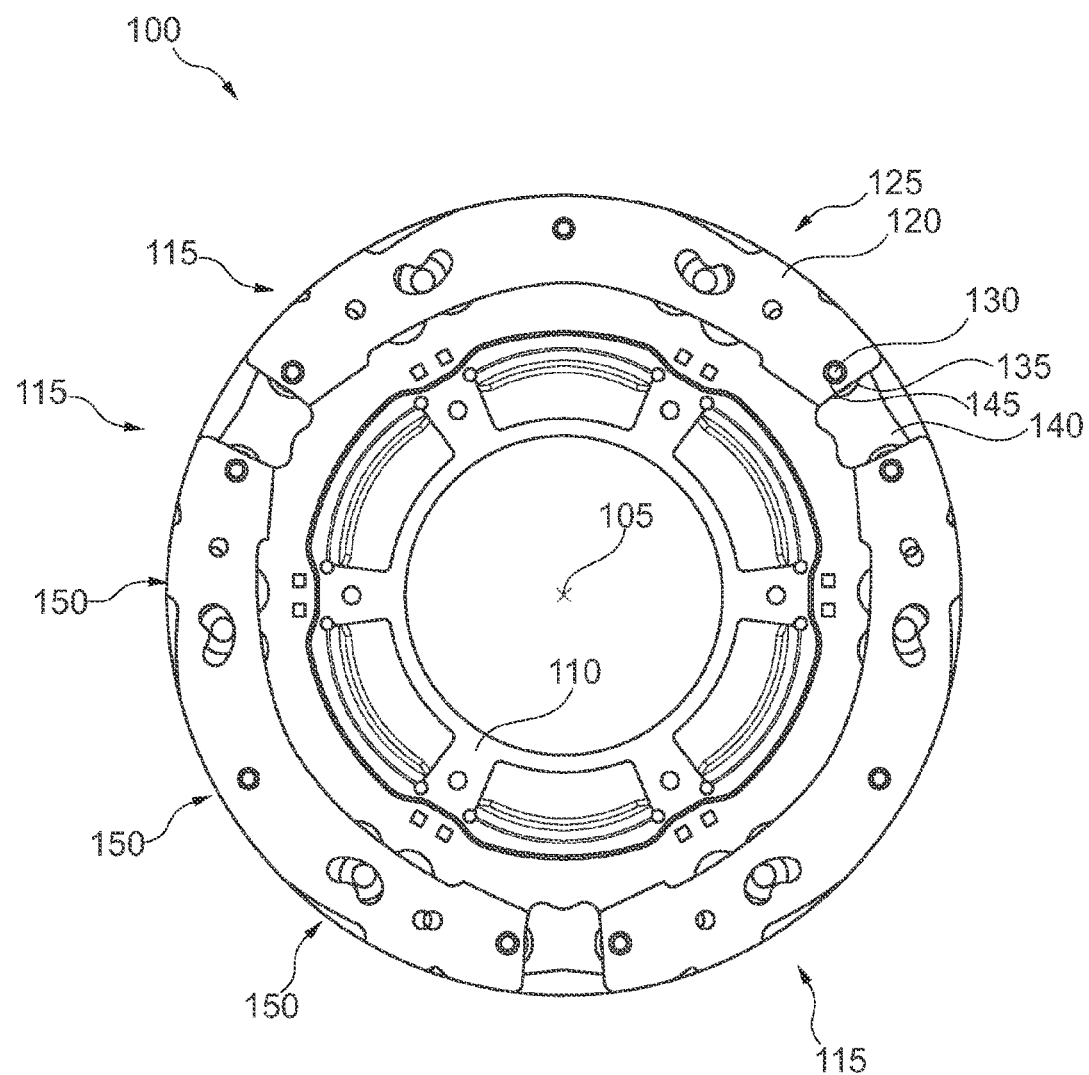
FIG. 1 is a front view of a torsional vibration damper.

FIG. 1 shows torsional vibration damper 100 for use in a drivetrain of a motor vehicle. Torsional vibration damper 100 is rotatably mounted around axis of rotation 105, and includes pendulum flange 110 and three pendulum mass pairs 115, which are distributed on a circumference around axis of rotation 105 on pendulum flange 110. Each pendulum mass pair 115 has first pendulum mass 120 and second pendulum mass 125, as well as bolt 130 and elastic element 135. Pendulum masses 120 and 125 lie axially aligned with each other on different axial sides of pendulum flange 110, so that rear pendulum mass 125 in FIG. 1 is not visible. Bolt 130 connects pendulum masses 120 and 125 with each other rigidly. Bolt 130 axially extends through cutout 140 in pendulum flange 110, which is dimensioned so that the pendulum mass pair 115 remains movable in the plane of rotation around axis of rotation 105 on pendulum flange 110.

Elastic element 135 is attached to bolt 130 and sits between pendulum masses 120 and 125 in the axial direction relative to axis of rotation 105, and proximate cutout 140 of the pendulum flange 110. Elastic element 135 can comprise an elastic synthetic material or a rubber material. In the depicted embodiment, elastic element 135 encircles bolt 130 around the latter's longitudinal axis, which runs parallel to axis of rotation 105. In an example embodiment, bearing 145 is provided between elastic element 135 and bolt 130 to enable elastic element 135 to rotate with respect to pendulum mass pair 115. In an example embodiment, bolt 130 is rotatably fastened to pendulum masses 120 and 125 and there is no need for bearing 145.

In an example embodiment, on every pendulum mass pair 115, on both ends lying in the circumferential direction around axis of rotation 105, there is a bolt 130 with an elastic element 135. The motion of pendulum mass pair 115 relative to pendulum flange 110 is dictated by the arrangement of bolts 130 fastened to pendulum masses 120 and 125, with elastic elements 135 interacting with cutout 140. The motion can be additionally prescribed by one or more sliding block guides 150. Preferably, the motion of each pendulum mass pair 115 relative to pendulum flange 110 is prescribed in such a way that a shifting or swiveling of pendulum mass pair 115 around axis of rotation 105 is accompanied by a rotation of pendulum mass pair 115 around a different axis of rotation, parallel to axis of rotation 105, so that the ends of pendulum mass pair 115 that lie in the circumferential direction opposite each other assume different radial distances from axis of rotation 105. An arrangement of this sort is called a trapezoid pendulum.

Figure 2:
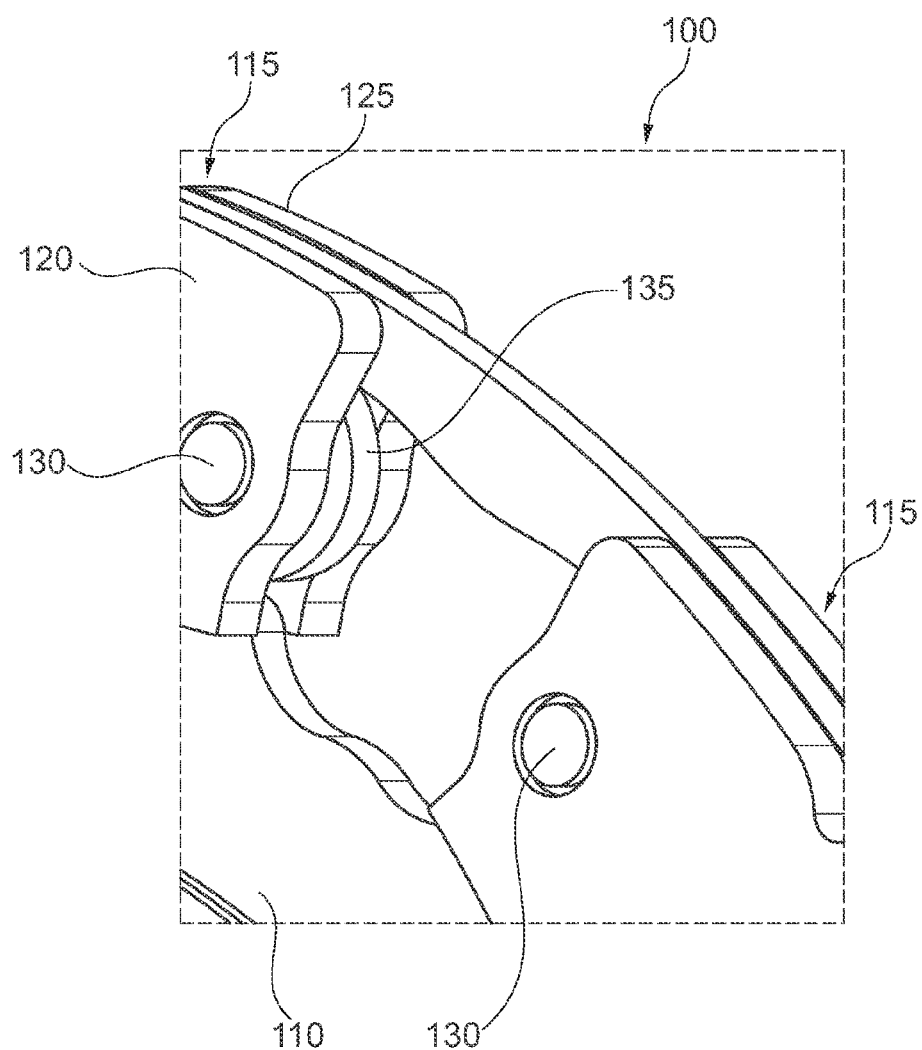
FIG. 2 is a detail of the torsional vibration damper from FIG. 1.

FIG. 2 shows a detail of torsional vibration damper 100 from FIG. 1. Elastic element 135 extends in a radially symmetrical pattern around bolt 130. In this case, the ends of pendulum masses 120 and 125 lying in the circumferential direction are formed so that only a predetermined fraction of elastic element 135 protrudes beyond the boundary of pendulum masses 120 and 125. This overhang, or fragment, of the elastic element can be determined in consideration of: a material, for example with regard to its tensile strength or yield strength; a demanded load alteration figure, which may be, for example, in the order of magnitude of 300,000; a maximum expected energy in the collision of two pendulum mass pairs 115 against each other, which can be in the range of 700 mJ; a geometry of elastic element 135; or, a combination thereof. If the rubber HNDR90, for example, is used as the material, then for a torsional vibration damper that is intended for a drivetrain of a motor vehicle, the overhang can be a maximum of 40% of the material strength. In the depicted embodiment, the material strength corresponds to the depth of elastic element 135 in the radial direction relative to bolt 130.

The contour of the circumferential ends of pendulum masses 120 and 125 that lie in the circumferential direction opposite each other follows the contour of elastic element 135 at a distance which defines the described overhang. The end contour of the pendulum masses 120 and 125 thereby describes the wave form which is clear in FIG. 2.

Figure 3:
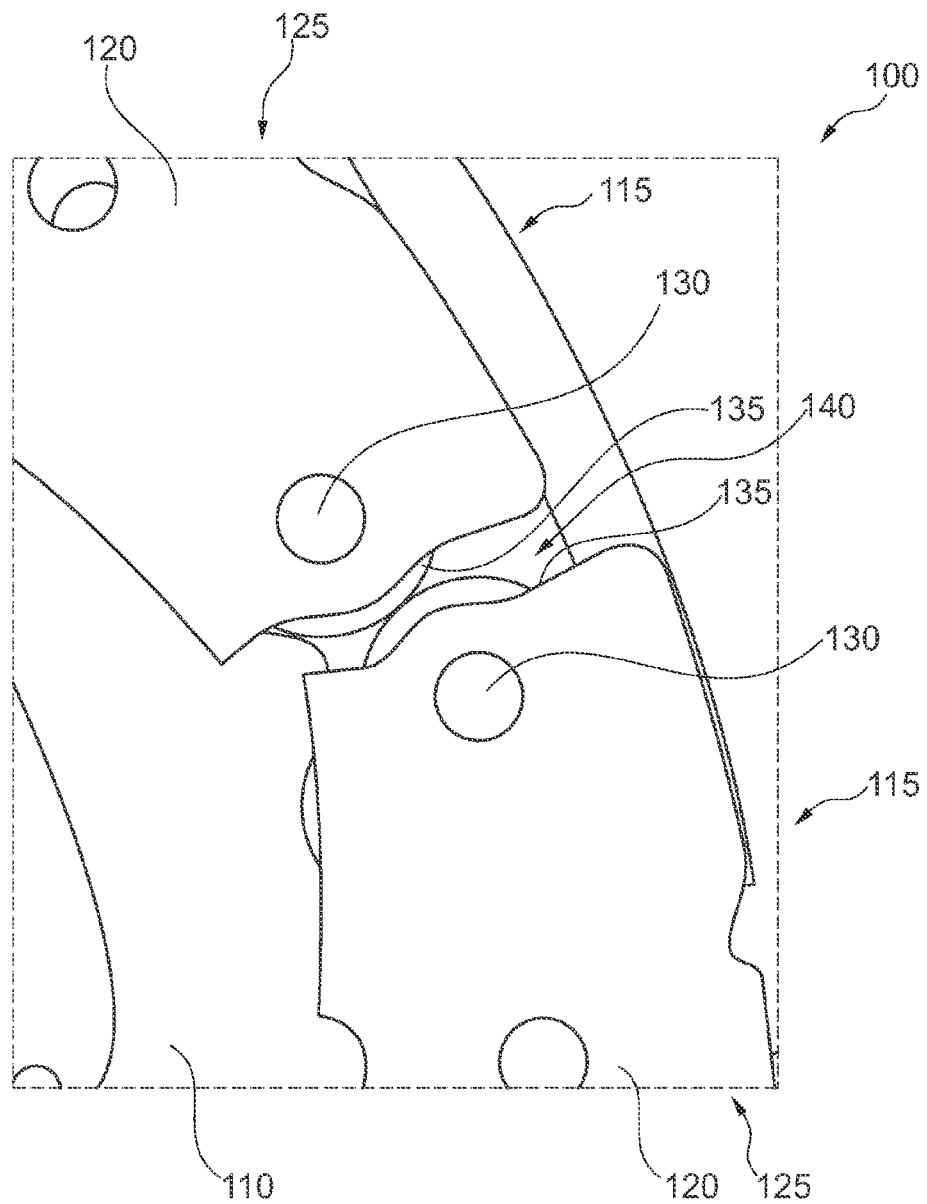
FIG. 3 is a detail from FIG. 2 with the torsional vibration damper in a first position; and, FIG. 4 is the detail from FIG. 2 with the torsional vibration damper in a second position.

FIG. 3 shows the detail of torsional vibration damper 100 from FIG. 2 in a first position. As in FIG. 1, the view is taken parallel to axis of rotation 105. Elastic elements 135 of pendulum mass pairs 115 (depicted in FIG. 3) touch each other, without pendulum masses 120, 125 of pendulum mass pairs 115 touching each other. The two ends of pendulum mass pairs 115 pointing toward each other, in other words circumferentially proximate to each other, are located at different radial distances from axis of rotation 105. This position represents only one possible operating state of torsional vibration damper 100, however; in other operating states the two ends can also occupy equal radial distances from axis of rotation 105.

Figure 4:
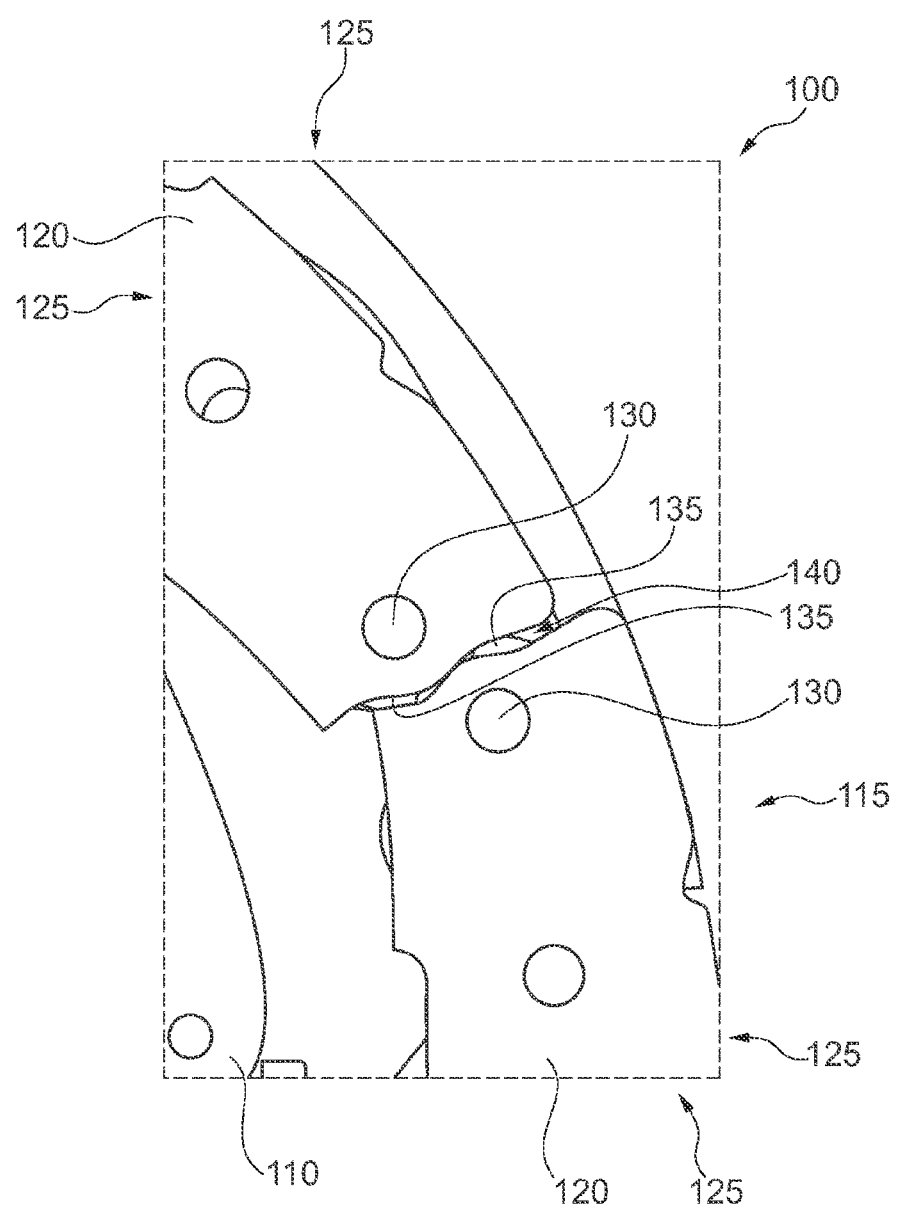

FIG. 4 shows the detail of torsional vibration damper 100 from FIG. 2 in a second position. Compared to the position shown in FIG. 3, the ends of pendulum mass pairs 115 have moved closer toward each other in the circumferential direction around axis of rotation 105, while elastic elements 135 have been correspondingly compressed. The compression of elastic elements 135 is limited by the ends of the pendulum masses 120 and 125 of the two adjacent pendulum mass pairs 115 colliding.

It must be noted that through this collision of pendulum masses 120 and 125 against each other, the compression of elastic elements 135 is limited only in the case of a collision of two adjacent pendulum mass pairs 115. If a radial movement of pendulum mass pair 115 outward or inward is damped by elastic element 135 at a boundary of cutout 140, then no collision is intended which would limit the compression of elastic element 135. In an example embodiment, such a collision can be provided, though elsewhere, for example by sliding block guides 150.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMBERS

100 Torsional vibration damper
105 Axis of rotation
110 Pendulum flange
115 Pendulum mass pair
120 First pendulum mass
125 Second pendulum mass
130 Bolt
135 Elastic element
140 Cutout
145 Sleeve/bearing
150 Sliding block guide

What is claimed is:
1. A torsional vibration damper, comprising:
  a pendulum flange having a plurality of cutouts and configured to rotate around an axis of rotation;
  a first pendulum mass pair movably attached to the pendulum flange and having:
    a first pendulum mass axially displaced from a second pendulum mass; and,
    a first bolt extending axially through a first cutout and fixedly securing the first pendulum mass to the second pendulum mass;
  a first elastic element attached to the first bolt;
  a second pendulum mass pair movably attached to the pendulum flange and adjacent to the first pendulum mass pair in a circumferential direction, the second pendulum mass pair having:
    a third pendulum mass axially displaced from a fourth pendulum mass, with the third pendulum mass adjacent to the first pendulum mass in the circumferential direction and the fourth pendulum mass adjacent to the second pendulum mass in the circumferential direction; and,
    a second bolt extending axially through the first cutout and fixedly securing the third pendulum mass to the fourth pendulum mass; and,
  a second elastic element, separate from the first elastic element, attached to the second bolt;
  wherein, the first and second elastic elements are operatively arranged to mutually impact each other in the circumferential direction to dampen a collision between the first and second pendulum mass pairs.

2. The torsional vibration damper of claim 1, wherein:
a first fragment of the first elastic element extends further than the first pendulum mass pair in the circumferential direction towards the second pendulum mass pair; and,
a second fragment of the second elastic element extends further than the second pendulum mass pair in the circumferential direction towards the first pendulum mass pair;
wherein the first and second fragments extend to a predetermined amount that enables the first and second pendulum mass pairs to mutually impact each other to limit a compression of the first and second elastic elements.

3. The torsional vibration damper of claim 1, wherein the first cutout is dimensioned so that the first and second elastic elements can also impact against radial boundaries of the first cutout.

4. The torsional vibration damper of claim 1, wherein the first and second pendulum mass pairs are guided bifilarly on the pendulum flange to enable the first pendulum mass pair to rotate around an axis of the first pendulum mass pair an to enable the second pendulum mass pair to rotate around an axis of the second pendulum mass pair.

5. The torsional vibration damper of claim 1, wherein the first and second elastic elements are attached to the first and second bolts, respectively, in a radially symmetrical pattern.

6. The torsional vibration damper of claim 5, wherein the first and second elastic elements are rotatable with respect to the first and second pendulum masses, respectively.

7. The torsional vibration damper of claim 1, wherein a first contour of the first and second pendulum masses in an area proximate the first and second elastic elements, respectively, follows a second contour of the first and second elastic elements.

8. The torsional vibration damper of claim 1, wherein:
the first and second bolts are proximate respective first ends, lying in the circumferential direction, of the first and second pendulum mass pairs;
the first pendulum mass pair includes:
  a third bolt passing through a second cutout, fixedly connecting the first and second pendulum masses to each other, and located proximate a second end, lying in the circumferential direction, of the first pendulum mass pair; and,
  a third elastic element attached to the third bolt; and,
the second pendulum mass pair includes:
  a fourth bolt passing through a third cutout, fixedly connecting the third and fourth pendulum masses to each other, and located proximate a third end, lying in the circumferential direction, of the second pendulum mass pair; and,
  a fourth elastic element attached to the fourth bolt, the torsional vibration damper further comprising:
a third pendulum mass pair movably attached to the pendulum flange and adjacent to the first and second pendulum mass pairs in the circumferential direction, the third pendulum mass pair including:
  a fifth pendulum mass axially displaced from a sixth pendulum mass;
  fifth and sixth bolts:
  fixedly securing the fifth pendulum mass to the sixth pendulum mass;
  passing through the second and third cutouts, respectively; and,
  proximate fourth and fifth ends, respectively, lying in the circumferential direction, of the third pendulum mass pair; and,
fifth and sixth elastic elements attached to the second bolt.

9. A torsional vibration damper, comprising:
a pendulum flange having a plurality of cutouts and configured to rotate around an axis of rotation;
a first pendulum mass pair movably attached to the pendulum flange and having:
  a first pendulum mass axially displaced from a second pendulum mass; and,
  a first bolt extending axially through a first cutout and fixedly securing the first pendulum mass to the second pendulum mass;
a first elastic element attached to the first bolt, the first elastic element arranged axially between the first pendulum mass and the second pendulum mass;
a second pendulum mass pair movably attached to the pendulum flange and adjacent to the first pendulum mass pair in a circumferential direction, the second pendulum mass pair having:
  a third pendulum mass axially displaced from a fourth pendulum mass, with the third pendulum mass adjacent to the first pendulum mass in the circumferential direction and the fourth pendulum mass adjacent to the second pendulum mass in the circumferential direction; and,
  a second bolt extending axially through the first cutout and fixedly securing the third pendulum mass to the fourth pendulum mass; and,
a second elastic element, separate from the first elastic element, attached to the second bolt, the second elastic element arranged axially between the third pendulum mass and the fourth pendulum mass;
wherein, the first and second elastic elements are operatively arranged to mutually impact each other in the circumferential direction to dampen a collision between the first and second pendulum mass pairs.

* * * * *